United States Patent [19]

Barrett et al.

[11] 3,721,964

[45] March 20, 1973

[54] INTEGRATED CIRCUIT READ ONLY MEMORY BIT ORGANIZED IN COINCIDENT SELECT STRUCTURE

[75] Inventors: John C. Barrett, Sunnyvale; Arndt B. Bergh; John E. Price, both of Palo Alto, all of Calif.; Tomas Hornak, United Kingdom

[73] Assignee: Hewlett-Packard Company, Palo Alto, Calif.

[22] Filed: Feb. 18, 1970

[21] Appl. No.: 12,262

[52] U.S. Cl.........340/173 SP, 340/166 R, 340/173 R

[51] Int. Cl........G11c 7/00, G11c 11/40, G11c 17/00

[58] Field of Search......340/173 R, 173 SP, 173 AM, 340/166

[56] References Cited

UNITED STATES PATENTS

| | | | |
|---|---|---|---|
| 3,226,695 | 12/1965 | Lemoine | 340/173 SP |
| 3,377,513 | 4/1968 | Ashby | 340/173 SP |
| 3,388,386 | 6/1968 | Deutermann | 340/173 R |
| 3,427,598 | 2/1969 | Kubinec | 340/173 R |
| 3,461,436 | 8/1969 | Navon | 340/173 SP |
| 3,478,319 | 11/1969 | Jordan | 340/166 R |
| 3,525,083 | 8/1970 | Slob | 340/166 X |
| 3,533,089 | 10/1970 | Wahlstrom | 340/173 R |
| 3,576,549 | 4/1971 | Hess | 340/173 SP |

FOREIGN PATENTS OR APPLICATIONS

| | | | |
|---|---|---|---|
| 1,131,210 | 10/1968 | Great Britain | 340/173 SP |

OTHER PUBLICATIONS

DeWitt, Memory Array, June 1967, IBM Technical Disclosure Bulletin, Vol. 10 No. 1, p. 95

*Primary Examiner*—Bernard Konick
*Assistant Examiner*—Stuart Hecker
*Attorney*—Roland I. Griffin

[57] ABSTRACT

An integrated circuit read only memory fabricated on a single semiconductor chip, the memory cell array being arranged with orthogonal sets of access lines providing coincident selection of unidirectional current devices, for example, base-emitter diodes, at the junctions of the access lines. The memory cells are read by detecting the presence or absence of current flow through one or more selected cells. One set of access lines is formed by base diffusion stripes spaced apart in a common-collector isolation well. The orthogonal set of access lines is formed by metal lines overlying the base stripes and the individual emitters diffused in the base stripes at the points of intersection with the metal lines. Programming of the bit pattern is accomplished by contacts between the emitters and the metal lines at selected cross-over points. An improved inverter circuit is provided in the memory array access circuitry.

7 Claims, 8 Drawing Figures

INVENTORS
JOHN C. BARRETT
ARNDT B. BERGH
JOHN E. PRICE
TOMAS HORNAK

INVENTORS
JOHN C. BARRETT
ARNDT B. BERGH
JOHN E. PRICE
TOMAS HORNAK

INVENTORS
JOHN C. BARRETT
ARNDT B. BERGH
JOHN E. PRICE
TOMAS HORNAK

INTEGRATED CIRCUIT READ ONLY MEMORY BIT ORGANIZED IN COINCIDENT SELECT STRUCTURE

BACKGROUND OF THE INVENTION

Read only memories (ROM) are being used increasingly in a variety of applications including character generation, logic control, code conversion, arithmetic logic, and the like. One form of ROM structure is shown in U.S. Pat. No. 3,381,279 issued Apr. 30, 1968, to A. B. Bergh, et al. entitled "Read Only Memory." This ROM system is constructed using four individual circuit boards, one for the memory array, one for the pulse drivers, one for the switching circuits, and an additional one for the sense amplifier circuitry. There are over 100 intraconnections between the core memory circuit board and the other boards, and the cycle time of operation for this memory is over 100 nanoseconds. The increased utilization of ROM circuits requires a faster access time, a smaller package size, and a lower cost.

BRIEF SUMMARY OF THE INVENTION

The present invention relates to a read only memory circuit employing integrated circuit techniques and including the memory array, the Y-line and X-line decoders, the input buffers, and the output drivers all formed on a single semiconductor chip, there being as few as 13 external contacts. This memory has an access time of less than 50 nanoseconds and provides input and output signal levels compatible with standard digital integrated circuit types such as TTL, DTL, CTL, etc.

The memory array of this invention is bit-organized in a coincident select structure with the memory cells located at the intersections of two orthogonal sets of access lines. The memory cells comprise unidirectional conducting devices arranged in a plurality of rows and columns, each cell in a row having one side of the unidirectional conducting device connected in common to one access line of the first set of access lines. Certain selected ones of the cells in each column have the other side of their unidirectional conducting devices coupled to an associated one of the access lines of the second set of access lines. Any one or more of the memory cells may be read by energizing one line of the first set of access lines and selecting one or more lines of the second set of access lines to determine whether or not current will flow from the energized line of the first set of access lines through a unidirectional conducting device to the selected one or more lines of the second set of access lines.

One memory array constructed in accordance with the present invention comprises a plurality of transistors, one at each of the coincidence points of the X and Y access lines coupled to the X and Y decoders, the array occupying a single common-collector isolation area. One set of conducting access lines is formed by base-diffused stripes in one direction, and the other set of conducting access lines is formed by metal line conductors in the other orthogonal direction, thus requiring only single layer metal technology in the fabrication. The emitters are diffused into the base stripes at every intersection of the metal line conductors, and the bit pattern is specified on the array by programmable emitter contact openings through which the metal line conductors may contact the associated emitters. Thus, the memory array may be programmed to any specific bit pattern by the custom selection of a single mask during fabrication of the integrated circuit.

A novel inverter circuit is utilized in the input circuit to the address decoders as well as the output driver circuitry, this novel inverter including a pair of output transistors and circuit means for insuring the proper sequence of operation of the output transistors.

Both true and complement outputs are available from this ROM and both the input and output voltage levels are compatible with standard integrated circuit devices. This monolithic bipolar ROM provides improved circuit performance including lower power, low input currents, high speed, and enhanced logic flexibility permitting a selection of several different formats. One ROM constructed in accordance with the present invention is formed on a 112 × 112 mil chip packaged in a standard 16 lead DIP, with address time less than 50 nanoseconds, typical power dissipation of 350 milliwatts, and bit *x* word format of 1 × 1024.

These and other features and advantages of the present invention will become more apparent from a perusal of the following specification taken in connection with the attached drawings.

DESCRIPTION OF THE PREFERRED EMBODIMENTS

Figure 1:
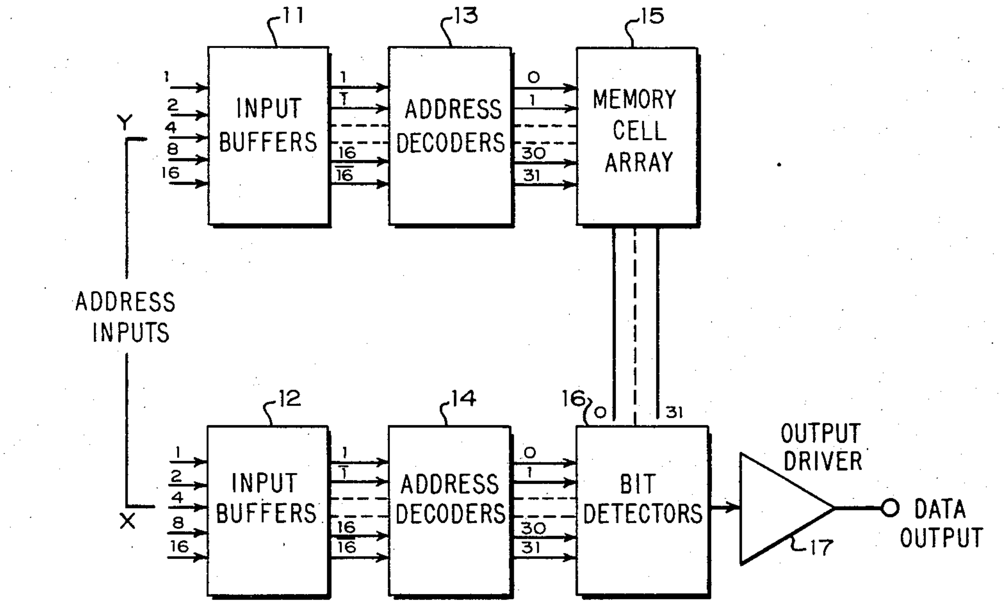
FIG. 1 is a block diagram of the logic organization of one form of ROM made in accordance with the present invention.

Referring now to FIG. 1, the integrated circuit read only memory comprises five Y and five X input buffer-inverter circuits 11 and 12, address decoders 13 and 14, the memory cell array 15, the bit detectors 16, and the output driver 17. The input buffer-inverter circuits 11 and 12 generate true and complement output signals Y and Y and X and X, respectively, for each of the five input signals to each circuit. The 10 output signals from each input buffer 11 and 12 are fed into the associated address decoders 13 and 14, respectively, each of which comprises 32 multi-input AND gates.

The address decoders 13 and 14 allow access to any desired coincidence location in the 32 × 32 memory cell array. The 32 bit detectors 16 sense the state of the addressed memory cell 15 and feed this information to the output driver 17 which may, for example, provide signal amplification, quantization, and level restoration. Bit organization with a linear select structure in a ROM of 1024 × 1 format would require 1024 address decoders; the coincident select structure of the present invention reduces the number of address decoders to 64.

In optimizing the construction of a high speed integrated circuit ROM there are a number of design criteria to be considered. Four of the major criteria are the minimization of each of the circuit power dissipation, signal propagation delay, circuit area, and the pad or output interconnection count. Minimizing the power dissipation and the signal propagation delay are conflicting criteria, the well-known power/delay tradeoff. For example, reduction of RC time constants by reduction of resistance results in increased power consumption. In the present integrated circuit ROM, emitter followers are utilized to achieve fast switching action and good capacitive driving capability without incurring excessive power consumption. Power gating techniques may be utilized in the address decoders to obtain power reduction without degrading the speed. Minimization of active and passive device area while retaining adequate current handling capability leads to reduced capacitances and higher speeds. Schottky diodes may be used for storage time reduction in saturated transistors to improve high speed performance. Thus, a combination of selected circuit, component and processing techniques are employed to minimize power dissipation and propagation delay times in the present ROM.

The third goal, that of minimizing circuit area, not only serves to reduce fabrication costs but also leads to improved high speed performance, due to reduced capacitances at the switching nodes. In the present invention, reduced circuit area has been achieved by the straightforward shrinkage of component area, consistent with known integrated circuit masking and diffusion tolerances, and also by careful logic organization and circuit design optimized for minimum area. The use of a coincident select structure rather than a linear select structure results in a considerable reduction in the number of addressed decoders and thus in the circuit area. In addition, the memory cell array circuit described hereinafter is designed to occupy a single common-collector isolation, hence reducing the area to about 1 square mil per cell. Also, the bit pattern for the memory cell array is specified by programmable contact openings in the silicon dioxide insulation layer, rather than by using a programmable metal mask. In this manner, when the metal line conductors are laid down, connection is made to the desired emitters through the contact openings in the insulation layer. This interconnect method alone reduces the size of the memory cell array by close to one half.

The fourth criteria, that of minimizing pad count, is met in the present invention by fabrication of the complete ROM on-chip. Although on-chip address inversion and decoding is in direct conflict with considerations of minimum power and minimum circuit area, the advantages of the fully on-chip fabrication justify any extra power and circuit area that may result. For example, with on-chip decoding, the ROM is much easier to test since there are considerably fewer pads to probe. In addition, the complete chip may be mounted on standard 16 dual in-line packages, as opposed to the prior approaches involving multi-chip assembly on complex multi-layer substrates, thus reducing packaging costs and minimizing the complexity of package-to-package interconnections.

The ROM of the present invention results in the use of a minimum circuit area and an optimum power/delay product figure of merit. In the embodiments shown in this application a total bit capacity of 1024 bits per chip is shown, with *x* word format flexibility including 4 × 256, 2 × 512, and 1 × 1024. Since these formats require eight, nine and 10 inputs and four, two and one outputs, respectively, then, together with power supply, ground, and chip select lines, the ROM chips are easily assembled on 14 or 16 lead dual in-line packages.

Figures 2, 3C, 3D:
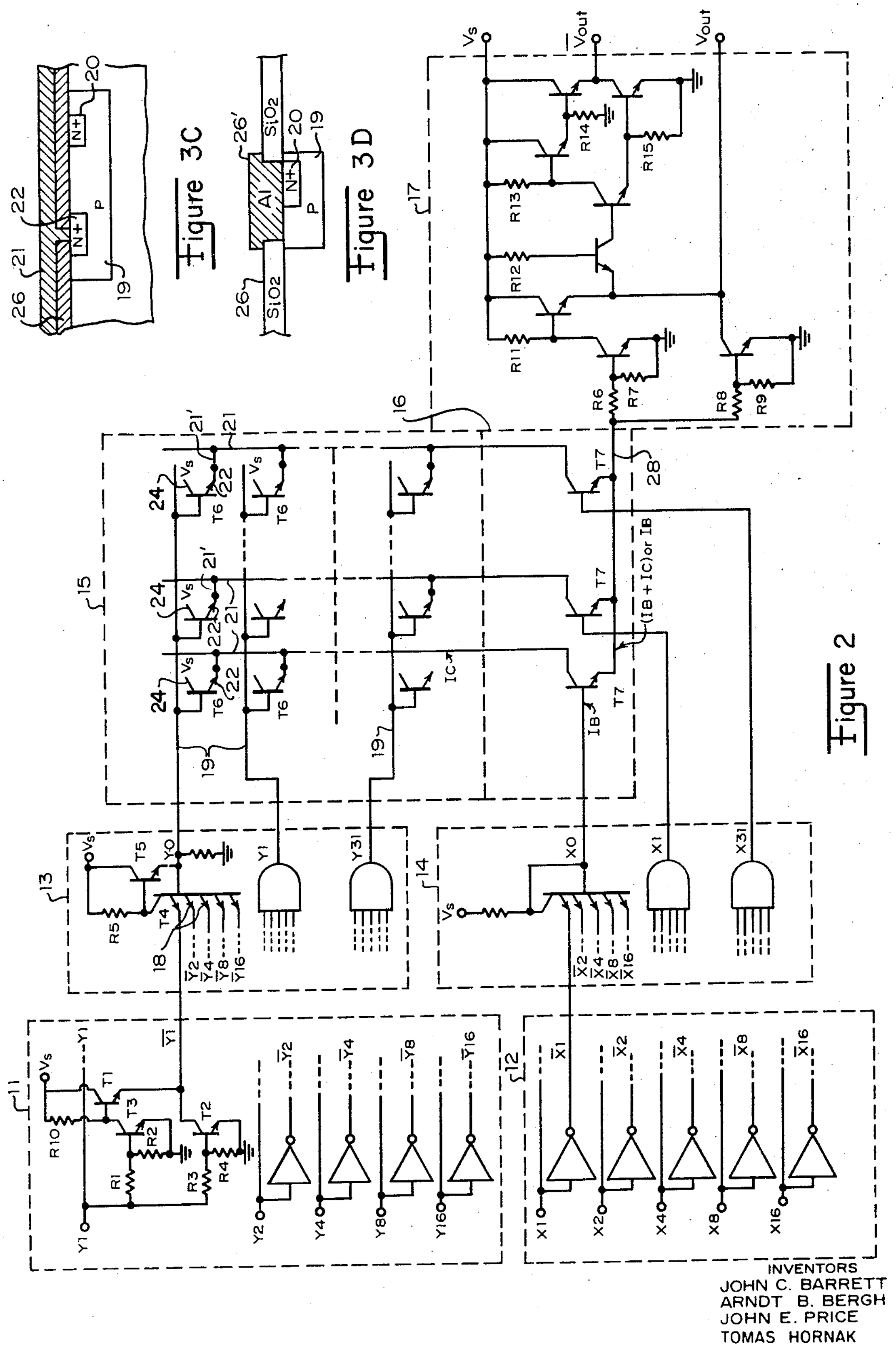
FIG. 2 is a schematic diagram showing the ROM of FIG. 1 in more detail.

Referring now to FIG. 2, there is shown the complete ROM circuitry fabricated on a single semiconductor chip 112 × 112 mils square. The circuit components include NPN transistors and diffused resistors. If desired, Schottky diodes may be utilized in parallel with the base-collector junctions for reduced storage time and therefore increased speed. Each input inverter circuit 11 and 12 comprises two output transistors T1 and T2 providing an output at their emitter-collector connection. The input resistor ratios R1:R2 and R3:R4 are chosen so that the transistor T3 coupled to the base of T1 turns on before transistor T2, and hence the base of transistor T1 is pulled low before T2 turns on, thus minimizing supply current spikes which can occur with active load output stages. The use of an active load transistor T1 results in a low output impedance in both the high and low logic states given high fanout and capacitive driving capability. The resistors in the input inverter have the following values (in ohms): R1, 2K; R2, 2.6K; R3, 1.6K; R4, 1.5K, and R10, 2.8K. With signal propagation delays of about 5 nanoseconds and average power dissipation of about 10 milliwatts, this circuit provides high speed, low power performance in a small area (only two collector isolation areas). In conjunction with the high input impedance buffers, a high performance input buffer-inverter is realized in about 100 square mils of area.

The address decoder 13 provides high performance with circuit simplicity. Both the true and complement address signals Y and Y are fed via metal connecting lines to the emitters 18 of associated multiple emitter transistors such as T4. Programmable contact openings allow the emitters 18 to make connection with either true or complement signals from the address inputs to generate the appropriate function at the decoder output. The emitter follower T5 in each AND circuit provides a low output impedance without requiring resistor R5 (3.8K) to be low in value, resulting in fast switching action for the AND gate with reduced power dissipation. In operation, both T4 and T5 operate in an active region, thus minimizing delay and storage time effects. Since the collector-base junction of T4 is reverse-biased, the inverse current gain effect which results in undesirable interactions between multiple emitter inputs is eliminated in this arrangement. If desired, further power reduction may be accomplished by driving the upper node of the resistor R5 from an input line rather than connecting it to the supply line $V_s$. In this manner the power dissipation in the address decoder may be halved, assuming a 50 percent duty cycle on the input line.

This address decoder circuit will provide propagation delays of about 5 nanoseconds at a 4 milliwatts power dissipation, with the circuit layout occupying about 40 square mils in area.

The memory cell comprises 1024 NPN transistors T6 arranged in an orthogonal emitter-follower array fabricated in one isolation well, the 32 horizontal conducting address lines being formed by base-diffused stripes 19 in one direction and the 32 vertical conducting address lines being formed by metal lines 21 in the other direction, thus requiring single layer metal technology in the integrated circuit fabrication. The emitters 22 are diffused into the base stripes 19 at every intersection of a metal line 21 and the bit pattern is specified by programmable emitter contact openings through which the metal lines 21 are connected via contacts 21' to an associated emitter 22 rather than by programmable metal connections.

A plan view (FIG. 3A) and cross sectional views (FIGS. 3B–3D) show one corner of a single isolation well including the P type substrate 23, the epitaxially grown N type layer 24, the P type diffusion isolation area 25, the P type diffusion base stripes 19, the N+ type emitters 22, the silicon dioxide insulation layer 26, the metal layer input lines 27 connecting the address decoder outputs to the base stripes 19, and the metal lines 21. To increase the speed of operation and minimize voltage drop, low resistance N+ diffusion stripes 20 coupled to the input lines 27 extend along each base stripe 19 and are periodically shorted to the base stripe by metal surface contacts 26', serving to reduce the IR drop and the distributed RC time constant along the length of the higher resistance base. By employing a plurality of cross-under N+ diffusion stripes 25' and 25'' to make connection with the metal lines 21 via contacts 25''' extending through the insulation layer 26, the need for two layer metal fabrication techniques is avoided. One group of crossunder diffusion stripes 25' serves to connect with the metal lines 21 on one half the array and the other group of crossunder diffusion stripes 25'' serves to connect with the metal lines 21 on the other half of the array ( N type stripes 25' and 25'' are diffused into P type regions **25*a*** ).

Certain of the metal lines 21 connect with the emitters 22 via connecting portions 21' through openings in the insulation layer 26. The single diffusion area of the common collector 24 for all of the transistors T6 in the array is connected to the supply voltage $V_s$. Since the entire array of 1024 bits is encompassed in a single collector isolation area and the programmable emitter contact openings technique is utilized, a high density memory cell array is provided which occupies about 1 square mil per cell.

In operation, for a 32 × 32 memory cell array 15, the row select address decoders 13 hold 31 out of the 32 base stripes 19 at a low voltage; the selected base stripe 19 is pulled high and forward-biases the base-emitter memory cells, i.e., unidirectional conducting devices, T6 in that particular selected row. Bit detection is accomplished by sensing the presence or absence of current in the appropriate emitter 22. The column select address decoders 14 hold 31 of the 32 bases of the bit select transistors T7 at a low voltage; the selected base is pulled high, turning on the associated bit select transistor T7. The presence or absence of bit current $I_C$ in the associated metal line 21, dependent on whether or not a contact 21' exists between an associated emitter 22 and line 21, is summed with the base current $I_B$ of the transistor T 7 to give two distinct current levels of $(I_B + I_C)$ or $I_B$ on the common emitter output line 28. Since 31 of 32 of the bit select transistors T7 are held off and current flows in only one of the 32 columns of the memory cell array, power dissipation is minimized.

The output driver 17 coupled to the output line 28 of the bit detectors T7 includes a circuit similar to that in the input inverter circuit. The input resister values are chosen so that the threshold values of the input current $I_{in\text{-}th}$ (where the output changes state) is given by $I_B < I_{in\text{-}th} < (I_B + I_C)$. The presence or absence of an emitter contact opening at the address location in the memory cell array will result in a low or high voltage logic level at the output of the output driver 17.

The input resistor ratios R6:R7 and R8:R9 are chosen to minimize supply current spikes during the turn-on and turn-off. The totem-pole output results in a low output impedance both in the low and the high output modes so that the effect of output loading on output rise and fall times is minimized. Additional chip select circuitry can force the output to a high impedance condition, so that the ROM outputs can be wired together to expand word capacity above that of the individual ROM package. The resistors in the output driver have the following values (in ohms): R6, 460; R7, 1K; R8, 260; R9, 320; R11, 1K; R12, 4K; R13, 800; R14, 4.2K; and R15, 560.

A variety of circuit ROM's may be fabricated in accordance with the present invention. Simple changes in the metal mask allow various formats including 4 × 256, 2 × 512, and 1 × 1024 to be fabricated in a chip area of about 12,000 square mils. Outputs may be specified to both sink and drive considerable output current, so that both current sinking logic types (TTL, DTL) and current sourcing logic types (RTL, CTL) can be driven from the ROM outputs.

Figure 4:
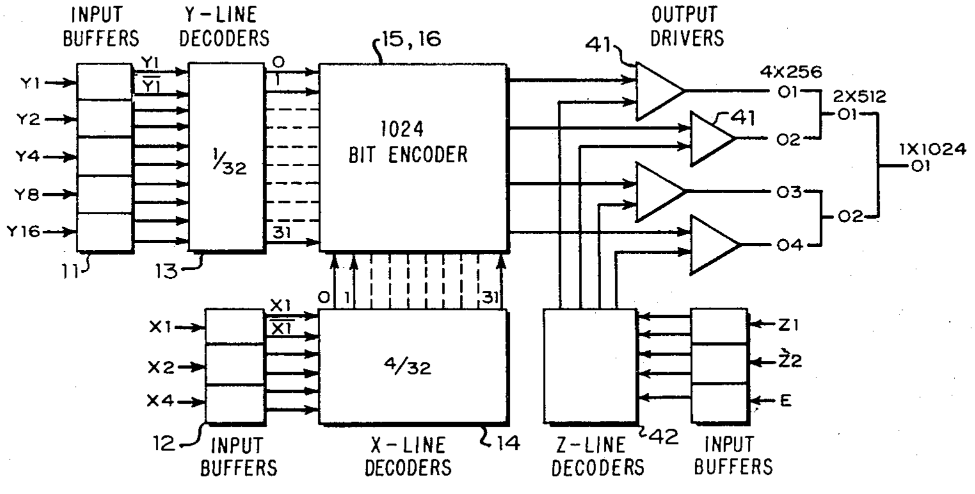
FIG. 4 is a block diagram of another form of ROM providing a plurality of formats.
Figures 3A, 3B, 5:
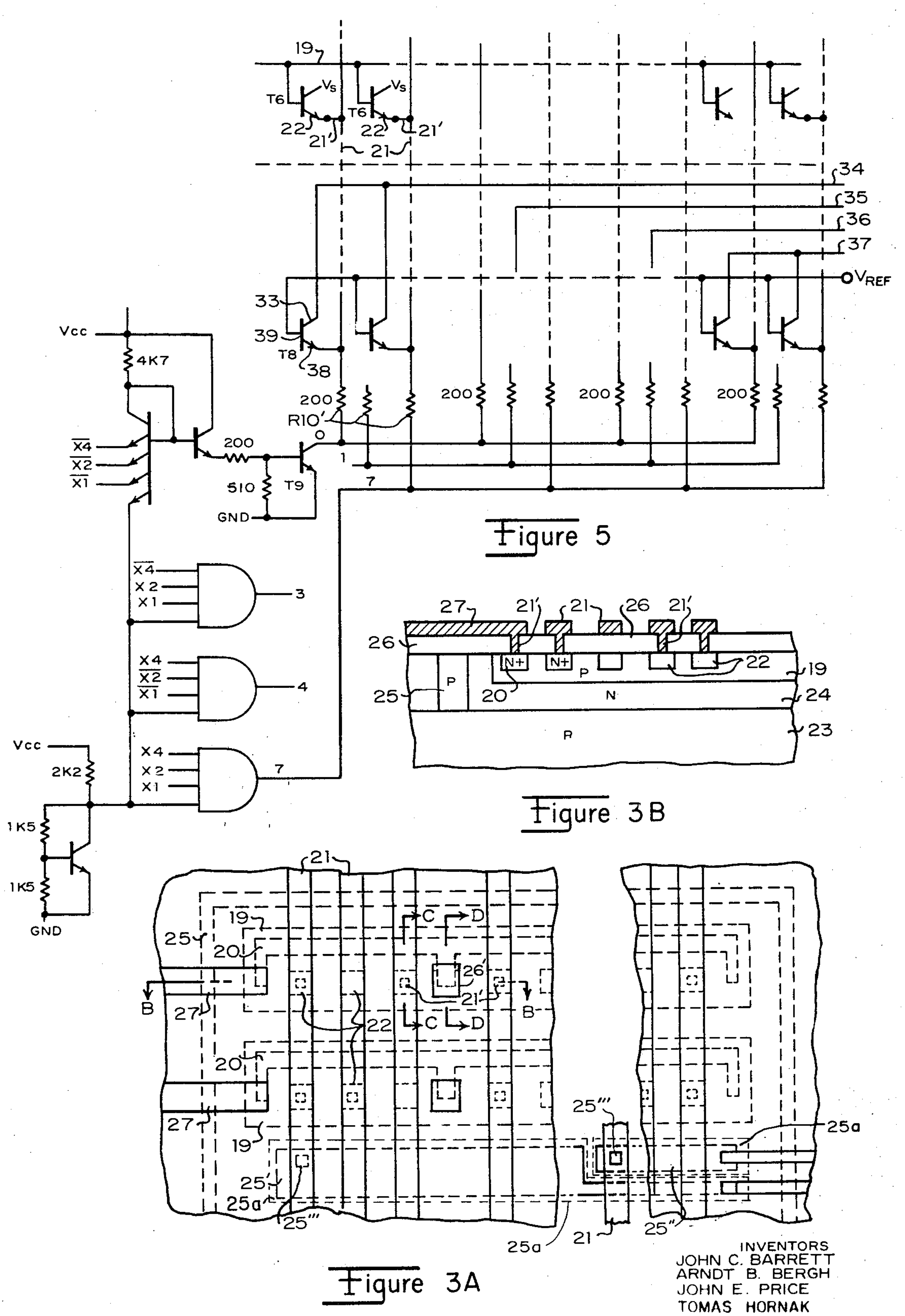
FIG. 3A is a plan view of a portion of the memory array showing the intersection of the metal lines and the base stripes.
FIGS. 3B, C and D are cross section views of the portion of the memory array taken through section lines 3B—3B, 3C—3C and 3D—3D, respectively, in FIG. 3A.
FIG. 5 is a schematic diagram of a portion of the system of FIG. 4 showing the bit detector circuitry.

Referring now to FIGS. 4 and 5, there is shown another form of read only memory made in accordance with the present invention and providing a flexible words *x* bits format of 1 × 1024, 2 × 512, and 4 × 256. In this system there are 4 bit detectors, each including eight transistors T8 having their collectors 33 connected in common to one of the four outputs 34, 35, 36 and 37 of the bit detectors. Each emitter 38 of the eight transistors T8 in a bit detector is connected through a resistor R10' to a separate one of the eight outputs from the X-line decoders. The bases 39 of each transistor T8 are connected in common to a reference voltage $V_{REF}$.

The outputs from the bit detectors are coupled to separate ones of the four output drivers 41, which also receive an enabling input from the Z-line decoders 42.

In operation, when one of the eight X-decoder transistors T9 is turned on, ground is connected to he lower ends of four resistors R10' associated with that particular transistor T9. Where contacts 21' exist between the emitters 22 of any of the four associated transistors T6 in the high base 19 and the metal lines 21, the base voltage of those transistors T6 is higher than the reference voltage $V_{REF}$ on the bases of the associated transistors T8 and current will flow through T6. No current will flow through the associated transistors T8 to the output lines 34–37.

On the other hand, where there is no contact 21′ between the emitters 22 associated with the high base stripe 19 and the metal lines 21, current will flow from the supply voltage in the output drivers 41 along the associated output lines 34–37 through T8, R10, and T9. Therefore, the presence or absence of contacts 21′ will determine whether or not current flows in the associated one of the output leads 34–37 to the output drivers 41.

Although this invention has been described with reference to sensing the flow of current through the emitters of transistor T6, it should be understood that the current flow through the common collector 24 could be sensed instead to detect the presence or absence of the emitter contact 21′. It should also be noted that active pull down on the emitter node of T5 is accomplished via T2 pulling down through the emitter-base junction of T4.

We claim:

1. A bipolar read only memory comprising a first plurality of address lines, an orthogonally-oriented second plurality of address lines, a first plurality of transistors arranged in a plurality of orthogonally oriented rows and columns, each of said first plurality of transistors having a base, a collector and an emitter, the bases of the transistors in each row of said first plurality of transistors being coupled in common to a different one of said first plurality of address lines, the collectors of said first plurality of transistors being connected in common to a source of supply voltage, the emitters of selected transistors in each column of said first plurality of transistors being coupled in common to a different one of said second plurality of address lines, a first address decoder circuit for energizing a selected one of said first plurality of address lines, said first address decoder circuit having a plurality of outputs, each of said first plurality of address lines being coupled to a different output of said first address decoder circuit, a second address decoder circuit for selecting one or more but less than all of said second plurality of address lines, said second address decoder circuit having a plurality of outputs, an output circuit, and a second plurality of transistors for detecting the presence or absence of current through each of said first plurality of transistors addressed by said selected one of said first plurality of address lines and said selected one or more of said second plurality of address lines, each of said second plurality of transistors having a base, a collector, and an emitter, the base of each of said second plurality of transistors being coupled to a different output of said second address decoder circuit, the collector of each of said second plurality of transistors being coupled to a different one of said second plurality of address lines, and the emitters of said second plurality of transistors being coupled in common to said output circuit.

2. A bipolar read only memory comprising a first plurality of address lines, an orthogonally oriented second plurality of address lines, a first plurality of transistors arranged in a plurality of orthogonally oriented rows and columns, each of said first plurality of transistors having a base, a collector, and an emitter, the bases of the transistors in each row of said first plurality of transistors being coupled in common to a different one of said first plurality of address lines, the collectors of said first plurality of transistors being connected in common to a source of supply voltage, the emitters of selected transistors in each column of said first plurality of transistors being coupled in common to a different one of said second plurality of address lines, a first address decoder circuit for energizing a selected one of said first plurality of address lines, said first address decoder circuit having a plurality of outputs, each of said first plurality of address lines being coupled to a different output of said first address decoder circuit, a second address decoder circuit for selecting one or more but less than all of said second plurality of address lines, said second address decoder circuit having a plurality of outputs, a plurality of output circuits, and a second plurality of transistors arranged in one or more groups, each of said second plurality of transistors having a base, a collector, and an emitter, the bases of said second plurality o transistors being coupled in common to a source of reference voltage, the collectors of the transistors in each group of said second plurality of transistors being coupled in common to a different one of said output circuits, the emitter of each of said second plurality of transistors being coupled to a different one of said second plurality of address lines, and the emitter of each transistor in each group of said second plurality of transistors also being coupled to a different output of said second address decoder circuit.

3. A bipolar read only memory comprising a semiconductor chip, a first plurality of transistors arranged in said chip in a plurality of orthogonally oriented rows and columns, an isolation well formed in said chip and serving as a common collector for said first plurality of transistors, a plurality of spaced-apart base diffusion stripes formed in and extending across said isolation well in one direction, each of said base diffusion strips serving as a common base for a different row of said first plurality of transistors, a plurality of emitter diffusion regions formed in and spaced apart along each of said base diffusion stripes, each of said emitter diffusion regions serving as the emitter of a different one of said first plurality of transistors, a plurality of spaced-apart metal lines extending orthogonal to said base diffusion stripes, each of said metal lines overlying a different one of the emitter diffusion regions in each of said base diffusion stripes, said metal lines being insulated from said base diffusion stripes and emitter diffusion regions and being connected to selected ones of said emitter diffusion regions through openings in the insulation between the metal lines and the emitter diffusion regions at selected locations where the metal lines overlie the emitter diffusion regions, a first address decoder circuit having a plurality of outputs, each of said plurality of base diffusion stripes being coupled to a different output of said first address decoder circuit, a second address decoder circuit having a plurality of outputs, an output circuit, and a second plurality of transistors formed in said chip, each of said second plurality of transistors having a base, a collector, and an emitter, the base of each of said second plurality of transistors being coupled to a different output of said second address decoder circuit, the collector of each of said second plurality of transistors being coupled to a different one of said plurality of metal lines, and the emitters of said second plurality of transistors being coupled in common to said output circuit.

4. A bipolar read only memory comprising a semiconductor chip, a first plurality of transistors arranged in said chip in a plurality of orthogonally oriented rows and columns, an isolation well formed in said chip and serving as a common collector for said first plurality of transistors, a plurality of spaced-apart base diffusion stripes formed in and extending across said isolation well in one direction, each of said base diffusion stripes serving as a common base for a different row of said first plurality of transistors, a plurality of emitter diffusion regions formed in and spaced apart along each of said base diffusion stripes, each of said emitter diffusion regions serving as the emitter of a different one of said first plurality of transistors, a plurality of spaced-apart metal lines extending orthogonal to said base diffusion stripes, each of said metal lines overlying a different one of the emitter diffusion regions in each of said base diffusion stripes, said metal lines being insulated from said base diffusion stripes and emitter diffusion regions and being connected to selected ones of said emitter diffusion regions through openings in the insulation between the metal lines and the emitter diffusion regions at selected locations where the metal lines overlie the emitter diffusion regions, a first address decoder circuit having a plurality of outputs, each of said plurality of base diffusion stripes being coupled to a different output of said first address decoder circuit, a second address decoder circuit having a plurality of outputs, a plurality of output circuits, and a second plurality of transistors formed in said chip and arranged in one or more groups, each of said second plurality of transistors having a base, a collector, and an emitter, the bases of said second plurality of transistors being coupled in common to a source of reference voltage, the collectors of the transistors in each group of said second plurality of transistors being coupled in common to a different one of said output circuits, the emitter of each of said second plurality of transistors being coupled to a different one of said plurality of metal lines, and the emitter of each transistor in each group of said second plurality of transistors also being coupled to a different output of said second address decoder circuit.

5. A bipolar read only memory comprising a semiconductor chip, a first plurality of transistors arranged in said chip in a plurality of orthogonally oriented rows and columns, an isolation well formed in said chip and serving as a common collector for said first plurality of transistors, a plurality of spaced-apart base diffusion stripes formed in and extending across said isolation well in one direction, each of said base diffusion stripes serving as a common base for a different row of said first plurality of transistors, a plurality of emitter diffusion regions formed in and spaced apart along each of said base diffusion stripes, each of said emitter diffusion regions serving as the emitter of a different one of said first plurality of transistors, a plurality of spaced-apart metal lines extending orthogonal to said base diffusion stripes, each of said metal lines overlying a different one of the emitter diffusion regions in each of said base diffusion stripes, said metal lines being insulated from said base diffusion stripes and emitter diffusion regions and being connected to selected ones of said emitter diffusion regions through openings in the insulation between the metal lines and the emitter diffusion regions at selected locations where the metal lines overlie the emitter diffusion regions, a first address decoder circuit coupled to said base diffusion stripes, a bit detector circuit and a second address decoder circuit coupled to said metal lines, and at least one output circuit coupled to said bit detector circuit, at least one of said first and second address decoder circuits, comprising a plurality of AND circuits, each of said AND circuits including a plurality of inputs, an output coupled to one of said first and second plurality of address lines, an input transistor having a base coupled to said output, a collector coupled to a source of supply voltage, and a plurality of separate emitters coupled to said inputs, and an output emitter follower transistor having a collector connected to a source of supply voltage, a base coupled to the collector of said input transistor, and an emitter coupled to said output.

6. A bipolar read only memory comprising a semiconductor chip, a first plurality of transistors arranged in said chip in a plurality of orthogonally oriented rows and columns, an isolation well formed in said chip and serving as a common collector for said first plurality of transistors, a plurality of spaced-apart base diffusion stripes formed in and extending across said isolation well in one direction, each of said base diffusion stripes serving as a common base for a different row of said first plurality of transistors, a plurality of emitter diffusion regions formed in and spaced apart along each of said base diffusion stripes, each of said emitter diffusion regions serving as the emitter of a different one of said first plurality of transistors, a plurality of spaced-apart metal lines extending orthogonal to said base diffusion stripes, each of said metal lines overlying a different one of the emitter diffusion regions in each of said base diffusion stripes, said metal lines being insulated from said base diffusion stripes and emitter diffusion regions and being connected to selected ones of said emitter diffusion regions through openings in the insulation between the metal lines and the emitter diffusion regions at selected locations where the metal lines overlie the emitter diffusion regions, a first address decoder circuit coupled to said base diffusion stripes, a bit detector circuit and a second address decoder circuit coupled to said metal lines, at least one output circuit coupled to said bit detector circuit, and a plurality of inverter circuits, each of said inverter circuits including an input, an output coupled to one of said first and second address decoder circuits, first and second transistors, each of said first and second transistors having a base, a collector, and an emitter, the base of said first transistor being coupled by a first circuit to said input, the collector of said first transistor being coupled in common with the emitter of said second transistor to said output, the emitter of said first transistor being coupled to a source of reference voltage, the collector of said second transistor being coupled to a source of supply voltage, and control means coupled to said input and to the base of said second transistor, said control means being responsive to a change in state of an input signal applied to said input for turning said second transistor off before said first transistor is turned on.

7. A read only memory as in claim 6 wherein said control means comprises a third transistor having a base, a collector, and an emitter, the base of said third transistor being coupled by a second circuit to said input, the collector of said third transistor being coupled to the base of said second transistor, the emitter of said third transistor being coupled to a source of reference voltage, said second circuit and said third transistor operating to turn said second transistor off before said first circuit operates to turn said first transistor on and operating to turn said second transistor on after said first circuit operates to turn said first transistor off.

* * * * *